United States Patent
Afshari et al.

(10) Patent No.: US 8,854,527 B2
(45) Date of Patent: *Oct. 7, 2014

(54) OPTICAL LENS HAVING FIXED LENSES AND EMBEDDED ACTIVE OPTICS

(75) Inventors: Bahram Afshari, Los Altos, CA (US); John Toor, Palo Alto, CA (US); Samuel Wennyann Ho, Foster City, CA (US); Peter Clark, Boxborough, MA (US)

(73) Assignee: Lensvector, Inc., Mountain View, CA (US)

( * ) Notice: Subject to any disclaimer, the term of this patent is extended or adjusted under 35 U.S.C. 154(b) by 284 days.

This patent is subject to a terminal disclaimer.

(21) Appl. No.: 13/318,440

(22) PCT Filed: May 3, 2010

(86) PCT No.: PCT/US2010/033347
§ 371 (c)(1),
(2), (4) Date: Dec. 1, 2011

(87) PCT Pub. No.: WO2010/129454
PCT Pub. Date: Nov. 11, 2010

(65) Prior Publication Data
US 2012/0092543 A1   Apr. 19, 2012

Related U.S. Application Data

(60) Provisional application No. 61/175,025, filed on May 3, 2009.

(51) Int. Cl.
*H04N 5/225* (2006.01)
(52) U.S. Cl.
CPC ........... *H04N 5/2254* (2013.01); *H04N 5/2257* (2013.01)
USPC ......................................... 348/340; 348/335

(58) Field of Classification Search
CPC ...................................................... H04N 5/2259
USPC .................................................... 348/335, 340
See application file for complete search history.

(56) References Cited

U.S. PATENT DOCUMENTS 4,781,445 A   11/1988   Baba et al.
5,808,679 A    9/1998   Shih
(Continued)

FOREIGN PATENT DOCUMENTS

JP   2005084387 A   3/2005
JP   2006243573 A   9/2006
(Continued)

OTHER PUBLICATIONS

International Preliminary Report on Patentability for PCT/US2010/039595 issued Jan. 12, 2012.
(Continued)

*Primary Examiner* — Tuan Ho
(74) *Attorney, Agent, or Firm* — J-Tek Law PLLC; Jeffrey D. Tekanic; Scott T. Wakeman

(57) ABSTRACT

An electrically controllable optical lens apparatus makes use of fixed lenses and an active optical element together in a lens enclosure. The enclosure may be a barrel structure that is easily mounted to a camera device having an image sensor. The active optical element, such as a tunable liquid crystal lens, receives an electrical signal from the camera device via electrical conductors integral with the lens enclosure that provide electrical pathways between the active element on the interior of the enclosure and surface contacts on the camera device. The enclosure may be a two-piece structure, and the electrical conductors may be attached to either piece of the structure. The lens enclosure may also be threaded for attachment to the camera device. The electrical conductors may also use spring loaded contact portions or molded interconnect devices.

30 Claims, 18 Drawing Sheets

(56) References Cited

U.S. PATENT DOCUMENTS

| | | |
|---|---|---|
| 6,359,674 B1 | 3/2002 | Horiuchi |
| 7,369,327 B1 | 5/2008 | Nishioka |
| 7,469,100 B2 | 12/2008 | Toor et al. |
| 7,715,107 B2 | 5/2010 | Loopstra et al. |
| 7,959,291 B2 | 6/2011 | Isobe et al. |
| 2004/0184163 A1 | 9/2004 | Nishioka et al. |
| 2006/0103758 A1 | 5/2006 | Yoon et al. |
| 2006/0203875 A1 | 9/2006 | Frenzel et al. |
| 2007/0031137 A1 | 2/2007 | Bogdan et al. |
| 2007/0063048 A1 | 3/2007 | Havens et al. |
| 2007/0229754 A1 | 10/2007 | Galstian et al. |
| 2007/0242173 A1 | 10/2007 | Blum et al. |
| 2008/0088756 A1 | 4/2008 | Tseng et al. |
| 2008/0144186 A1 | 6/2008 | Feng et al. |
| 2008/0165427 A1 | 7/2008 | Tseng et al. |
| 2008/0251707 A1 | 10/2008 | Kathman et al. |
| 2008/0277480 A1 | 11/2008 | Thuries et al. |
| 2008/0297911 A1 | 12/2008 | Christenson et al. |
| 2009/0134483 A1 | 5/2009 | Weng et al. |
| 2009/0190232 A1 | 7/2009 | Craen et al. |
| 2009/0302116 A1 | 12/2009 | Tan et al. |
| 2010/0247086 A1 | 9/2010 | Tallaron et al. |
| 2010/0276492 A1 | 11/2010 | Wang et al. |
| 2010/0295987 A1 | 11/2010 | Berge |
| 2012/0200764 A1* | 8/2012 | Afshari et al. ............... 348/345 |

FOREIGN PATENT DOCUMENTS

| | | | | |
|---|---|---|---|---|
| JP | 2008-092314 | * | 4/2008 | ............ H04N 5/238 |
| KR | 100856092 B1 | | 9/2008 | |
| WO | WO2007098602 | | 9/2007 | |
| WO | WO2008041469 | | 4/2008 | |
| WO | WO2009153764 | | 12/2009 | |
| WO | WO2010022503 | | 3/2010 | |
| WO | WO2010083211 | | 7/2010 | |
| WO | WO2010129460 | | 11/2010 | |

OTHER PUBLICATIONS

International Search Report and Written Opinion for PCT/US2010/033347.

International Search Report and Written Opnion for PCT/US2010/039595 issued Sep. 13, 2011.

International Search Report for PCT/US2010/033357 issued Apr. 10, 2010.

Written Opinion for PCT/US2010/033357 issued Apr. 10, 2010.

Office Action dated Feb. 14, 2014, from co-pending U.S. Appl. No. 13/338,756 discussing KR-10-0856092.

Office Action dated May 28, 2014, from co-pending U.S. Appl. No. 13/338,756 discussin KR-10-0856092.

* cited by examiner

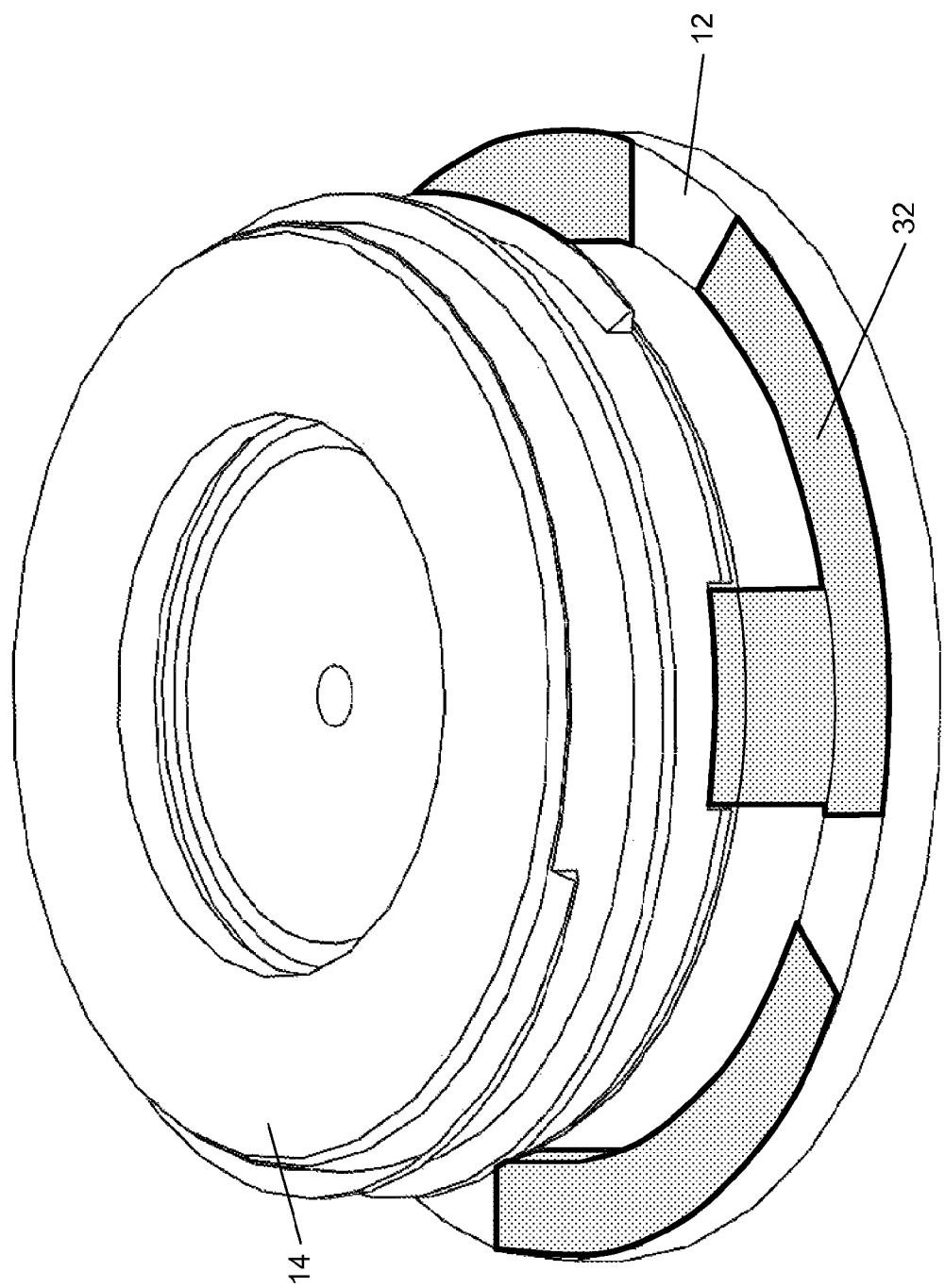

OPTICAL LENS HAVING FIXED LENSES AND EMBEDDED ACTIVE OPTICS

This application claims priority of U.S. provisional patent application 61/175,025 filed May 3, 2009.

FIELD OF THE INVENTION

This invention relates generally to optical devices and assemblies and, more specifically, to lenses having active optical control.

BACKGROUND OF THE INVENTION

Lens structures for optical devices such as cameras consist of multiple lens elements assembled in a single barrel or stacked in a wafer form, utilizing spacers, to create fixed focus lens assemblies. These lens structures have a fixed focal plane and are mechanically moved to focus on objects in varying distances to the camera system.

Tunable liquid crystal lenses (TLCL) that have a flat layer construction are known in the art, as described in PCT patent application WO 2007/098602, published on Sep. 7, 2007, as well as in PCT patent application WO 2009/153764 published Dec. 23, 2009, the specifications of which are hereby incorporated by reference as if fully set forth herein.

SUMMARY OF THE INVENTION

In accordance with the present invention, an electrically controllable optical lens apparatus is provided that has a first optical lens and a second optical lens fixed in position relative to each other such that an optical signal can pass through both lenses. Located at a fixed position within the apparatus, which in a first embodiment is a position between the first and second lenses, is an electrically controllable active optical element. The active optical element which may be, for example, a tunable liquid crystal lens (TLCL), changes its optical characteristics from a first state to a second state in response to an input electrical signal, such that it exerts a different optical influence on the optical signal in the first state than in the second state. In the case of a tunable lens, the active optical element may change between many states, changing the overall optical power of the entire lens apparatus.

In one exemplary embodiment, the lens apparatus has the active optical element positioned within a lens stack. In this configuration, by applying a required electrical signal to the active element, the optical properties of the lens assembly are modified without any mechanical movement. In case of a TLCL as the active optical element, the focal plane of the lens structure could be moved, thus creating a variable focus (e.g. auto focus) device. Alternatively, the active element can function as an aperture stop, shutter, IR cut filter or other mechanism in the lens stack, resulting in a possibly shorter and improved overall lens design.

When the TLCL is located inside the stack, the aperture of the TLCL can be smaller than if the TLCL is located outside the stack (typically 25% smaller).

In one embodiment, a lens mounting structure having a barrel shape is used to enable easy assembly of the active element into the lens stack. In this embodiment, a lens barrel is split into two sections at the active optical element plane. Mechanical features on the fixed focus lens elements are used to establish assembly spacing and alignment. In this configuration, the active optical element is designed to be integrated into the stack without interfering with precise alignment and spacing of other optical elements within the stack. A special feature on the fixed elements is used to align and space these elements without interference from the active optical element. The active optical element may have a substantially planar shape and, in one embodiment, is roughly square. With such a square shape, extra space around the active optical element may be used to provide alignment and spacing, which is required in conventional fixed lens systems to achieve acceptable optical performance.

An integrated electrical connection structure and method is also provided to enable electrical contacts as part of the lens barrel assembly. At least one electrical contact provides an electrically conductive path between an outer surface of the lens mounting structure and the active optical element. The contact may be a stamped metallic piece with an incorporated spring element to ensure reliable electrical connection to a contact on a receiving device to which the lens apparatus is mounted. Alternatively, a molded interconnect device (MID) also may be used to create a connection between the active optical element and camera housing or surrounding devices. An MID would be used in place of lead frames in the device. Connection to the embedded active optical element may be achieved by means of conductive adhesives.

Two different barrel assembly methods and structures are proposed. The first is a threaded barrel with appropriate matching threads on the housing of a receiving device to which the lens apparatus is mounted. In a second variation, a ramp design is used to ensure proper positioning of the contacts with respect to corresponding contacts on the camera housing. In this approach a single thread is created with a locking stop mechanism to define the distance of lens barrel from the sensor in a deterministic way. In the ramp design no focusing operation is required at assembly and optical device relies solely on the active optical element for proper focusing.

BRIEF DESCRIPTION OF THE DRAWINGS

The following figures show features and different embodiment of the proposed design.

FIG. 6 is a perspective view of a lens structure according to the present invention in which a molded interconnect device is used to provide electrical connection between an active optical element and an inner surface of an outer portion of the lens structure.

DETAILED DESCRIPTION

The present invention is directed to an optical lens apparatus that uses fixed lenses in combination with an electrically controllable liquid crystal optical device. Depending on the specific configuration, the apparatus may be directed to one of several applications. In each of these embodiments, the apparatus has an overall "barrel structure" and uses the optical properties of the fixed lenses in combination with the electrically controlled optical properties of the liquid crystal device.

Figure 1:
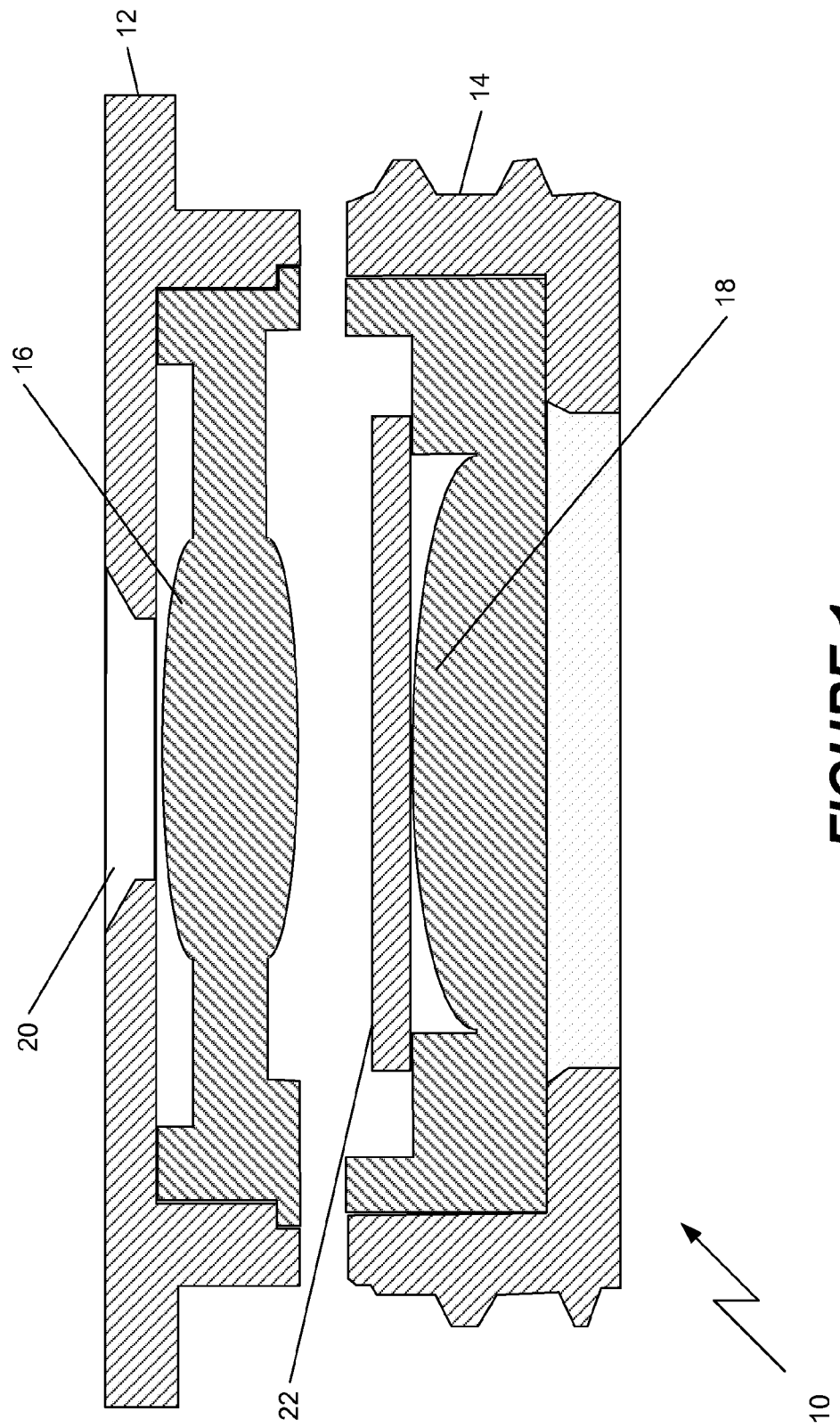
FIG. 1 is a cross sectional view of a first embodiment of a lens structure according to the present invention

Shown in FIG. 1 is a schematic view of a first embodiment of the invention in which a variable focus lens 10 has a barrel structure consisting of two portions, an outer portion 12 and an inner portion 14. The lens may be used in a variety of different applications, including compact digital cameras, such as might be integrated into a portable telephone. Each of the two portions includes a fixed lens, lens 16 in the outer portion 12, and lens 18 in the inner portion 14. Light from a subject in front of the outer portion 12 is collected via aperture 20 and focused by the outer portion fixed lens 16. This focused light is refocused by the fixed lens 18 of the inner portion to form an image on a desired imaging device, such as a CMOS or a charge-coupled device type detector, etc. (not shown). The overall focusing of the variable focus lens 10 is, however, adjustable by way of a tunable lens 22 positioned between the fixed lens 16 and the fixed lens 18.

In the present embodiment, the tunable lens 22 is a tunable liquid crystal lens (TLCL), such as that discussed in PCT patent application publication WO 2009/153764 published Dec. 23, 2009, the substance of which is incorporated herein by reference. As is discussed in this and other disclosures, a TLCL is a liquid crystal based lens structure for which the focusing power changes with changes to an applied electric field. As the electric field is typically generated by an input electrical signal, variation of that signal may be used to change the tuning of the lens. The tuning range of the TLCL may include a zero optical power level at which it adds no focusing effect to the overall lens structure. However, as the electrical signal supplied to the TLCL changes, the optical power of the lens changes with it, causing an overall change in the focal length of the variable focus lens 10.

The two portions of the variable focus lens 10 are shown separated from each other in FIG. 1, but are part of a single integral component during operation. In the present embodiment, the two portions are separate and are joined together at the position of the active optical plane, i.e., the location of the TLCL. When assembled, the variable focus lens has a "barrel" shape, as is evident in the perspective view of FIG. 2. In the present embodiment, the barrel shape has a thread 24 along its curved outer surface, allowing the variable lens to be screwed into a threaded hole on an apparatus (such as a camera) on which it is installed, although other connection means may be used instead.

Figure 2:
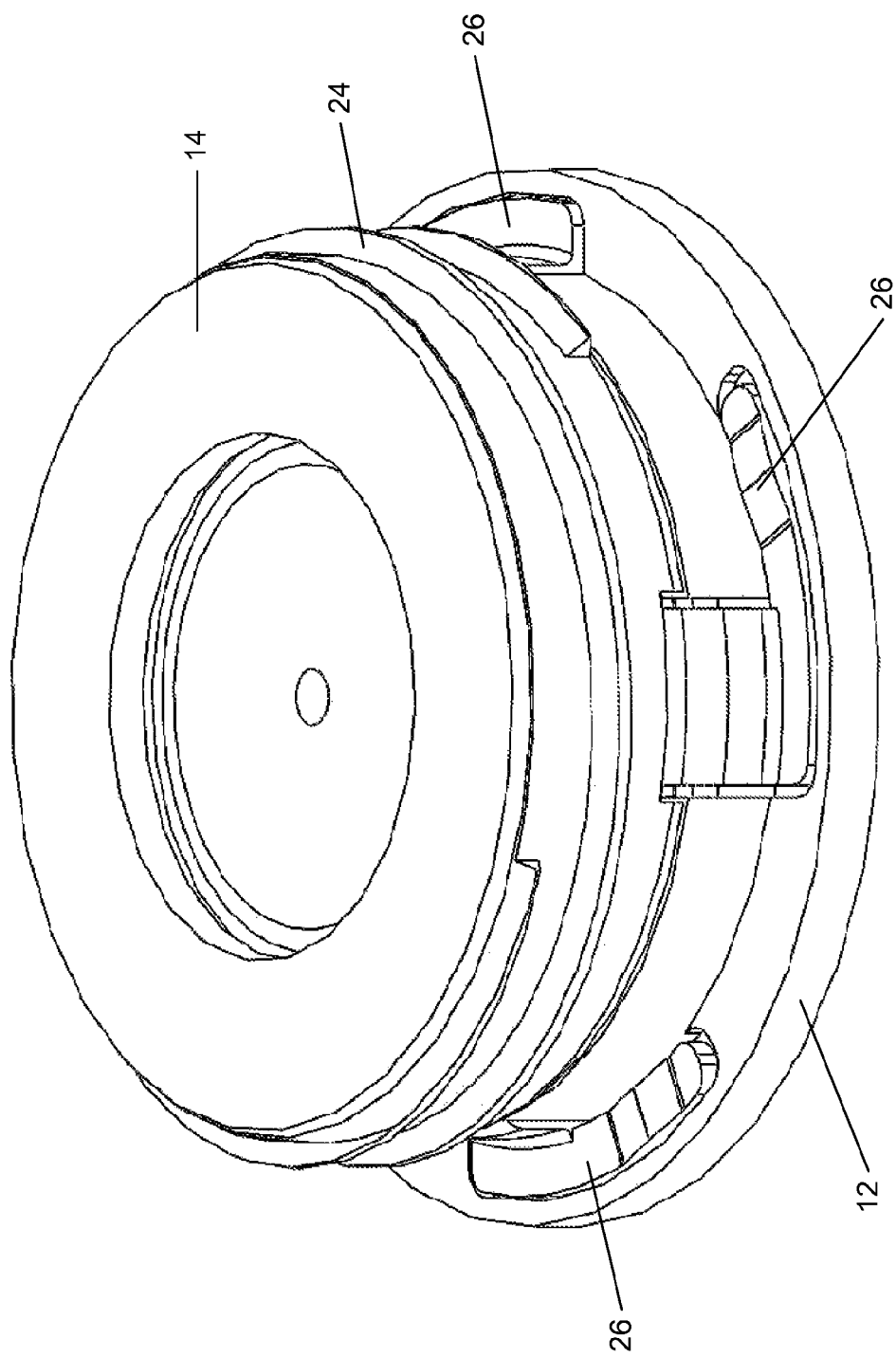
FIG. 2 is a perspective view of the lens structure of FIG. 1.
Figure 2A:
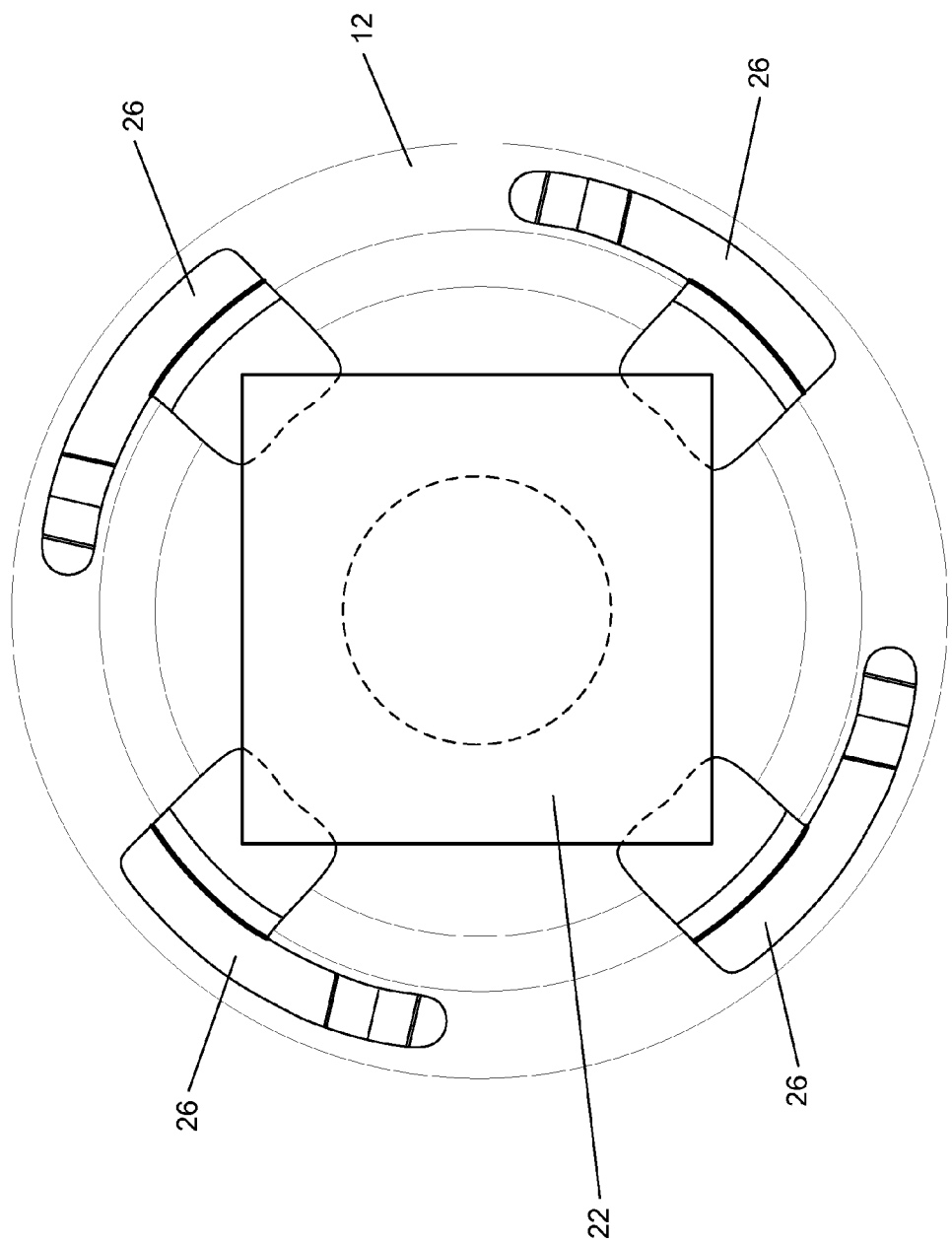
FIG. 2A is an isolated view of an outer portion of the lens structure of FIG. 1 showing an active optical element adjacent thereto.

Also shown in FIG. 2 are a set of electrical contacts 26 by which electrical connection with the TLCL may be made. These contacts can be stamped metallic pieces with incorporated spring elements that help ensure reliable electrical connection. Corresponding electrical contacts on the apparatus to which the lens is mounted allow convenient electrical signal routing. The relative positioning of the TLCL 22, which in this embodiment has a generally square shape, and the outer portion 12 of the barrel structure is shown in the isolated view of FIG. 2A. This figure provides a view of the interior of the barrel structure, and shows how electrical contacts located in the corners of the TLCL 22 make contact with the electrical contacts 26 of the barrel structure. Thus, electrical continuity is easily provided from a surface of the apparatus to which the lens is mounted to the electrically-activated TLCL 22 on the interior of the lens structure.

Figure 3:
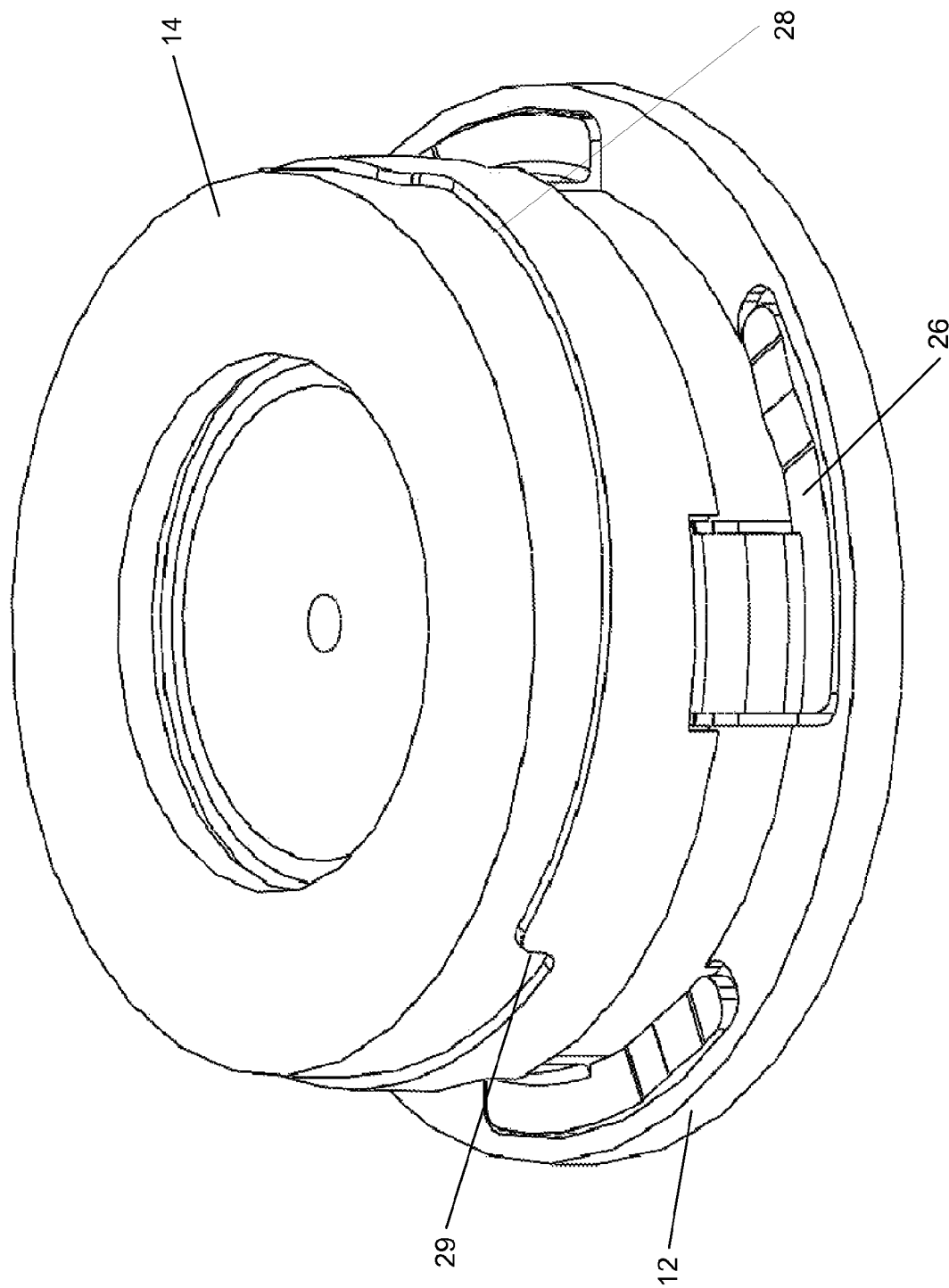
FIG. 3 is a perspective view of a lens structure according to the present invention that uses a ramp structure and electrical connections near a top of a barrel portion of the lens structure.

An alternative arrangement for assembly of the system uses a ramp or cam surface 28 on the barrel of the lens 10, as is shown in FIG. 3. This ramp allows for barrel adjustment during assembly. The ramp is essentially a circumferential lip that extends radially from an outer surface of the barrel, and that includes a flat surface 29 that functions as a stop mechanism during rotation of the barrel. When the barrel is inserted into a mounting socket of a device to which the barrel is attached, the ramp 28 makes contact with a corresponding ramp on an inner surface of the mounting socket (not shown). As the barrel is rotated counter-clockwise (relative to a view facing an outer surface of outer portion 12), the two ramps slide against each other until the flat surface 29 of the ramp 28 meets a corresponding flat surface of the mounting socket. Thus, when the barrel is attached to the housing of the corresponding optical device using the ramp method, the barrel stops in a predetermined position with respect to an internal component of the device, such as a CMOS sensor. The barrel may then be permanently attached to the device using, for example, adhesive or ultrasonic welding, or any other technique known in the art. Using this arrangement, no focusing operation is required at assembly, and the optical variable lens 10 relies solely on the TLCL for proper focusing. Those skilled in the art will recognize that other ways of providing assembly may also be used.

Figure 4:
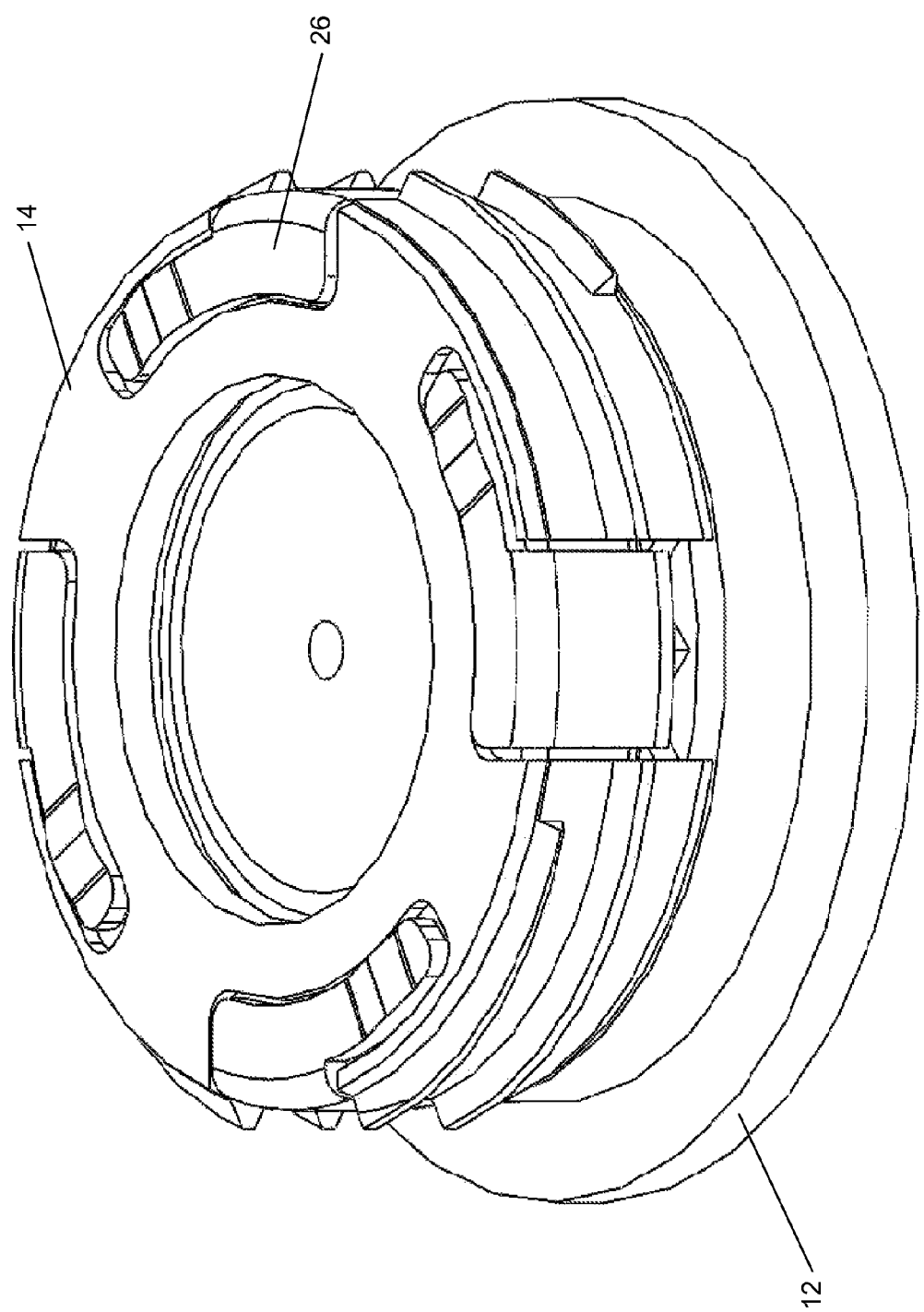
FIG. 4 is a perspective view of a lens structure according to the present invention that uses electrical connections on an inner surface of an inner portion of the lens structure.

Another embodiment of the present invention is shown in FIG. 4, and makes use of electrical contacts located at the innermost surface of the barrel structure. This is in contrast to the positioning of the contacts on an inner surface of the outer portion 12, as shown, for example, in FIG. 2. In both embodiments, the electrical contacts 26 pass between the outer portion 12 and the inner portion 14 to make contact with the TLCL. However, while the contacts of the FIG. 4 embodiment extend to a surface of the inner portion 14, where they will make contact with corresponding contacts of the apparatus to which the variable lens is mounted 10, those of the FIG. 2 embodiment are extended to the aforementioned inner surface of the outer portion. The particular configuration of the contacts in one of these two arrangements is a matter of design convenience.

Figure 5:
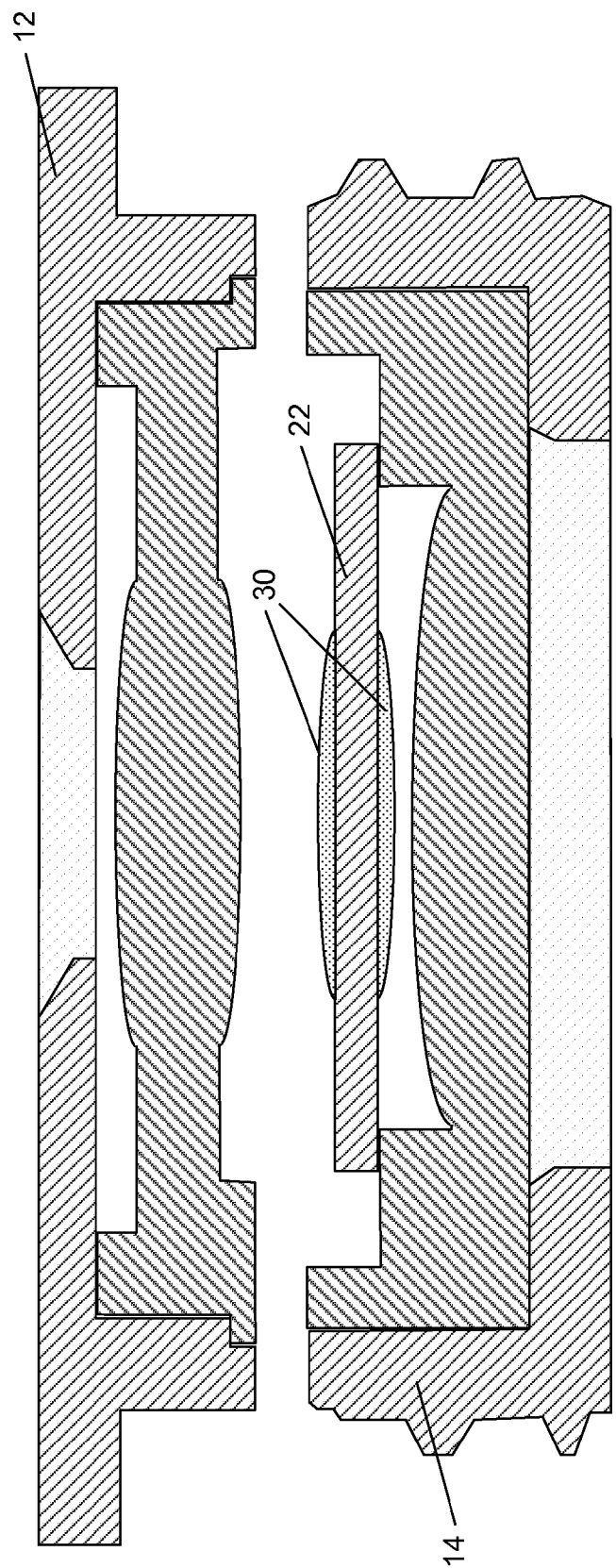
FIG. 5 is a cross sectional view of a lens structure according to the present invention in which fixed lenses are formed on the surfaces the upper and lower substrates of an active optical element.

In still another embodiment of the invention, a fixed lens integral with the TLCL is used. As shown in FIG. 5, the TLCL includes a fixed lens 30 molded onto its surface. Further disclosure of such a lens construction set out in PCT patent application publication WO/2010/022503 published Mar. 4, 2010, the specification of which is hereby incorporated by reference.

Figure 6A:
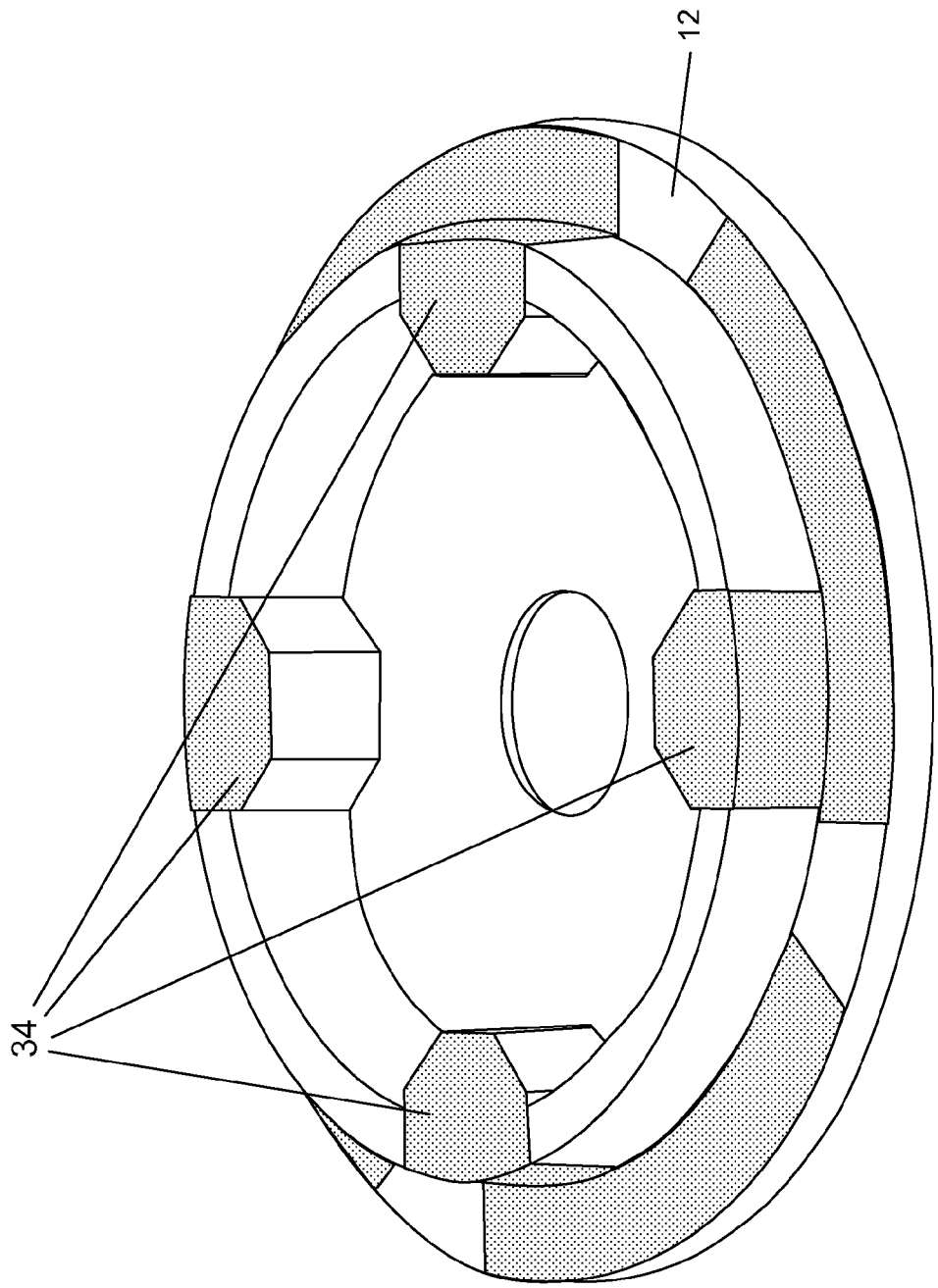
FIG. 6A is a perspective view of an interior of an outer portion of the structure of FIG. 6 showing the location of electrical contact points.
Figure 6B:
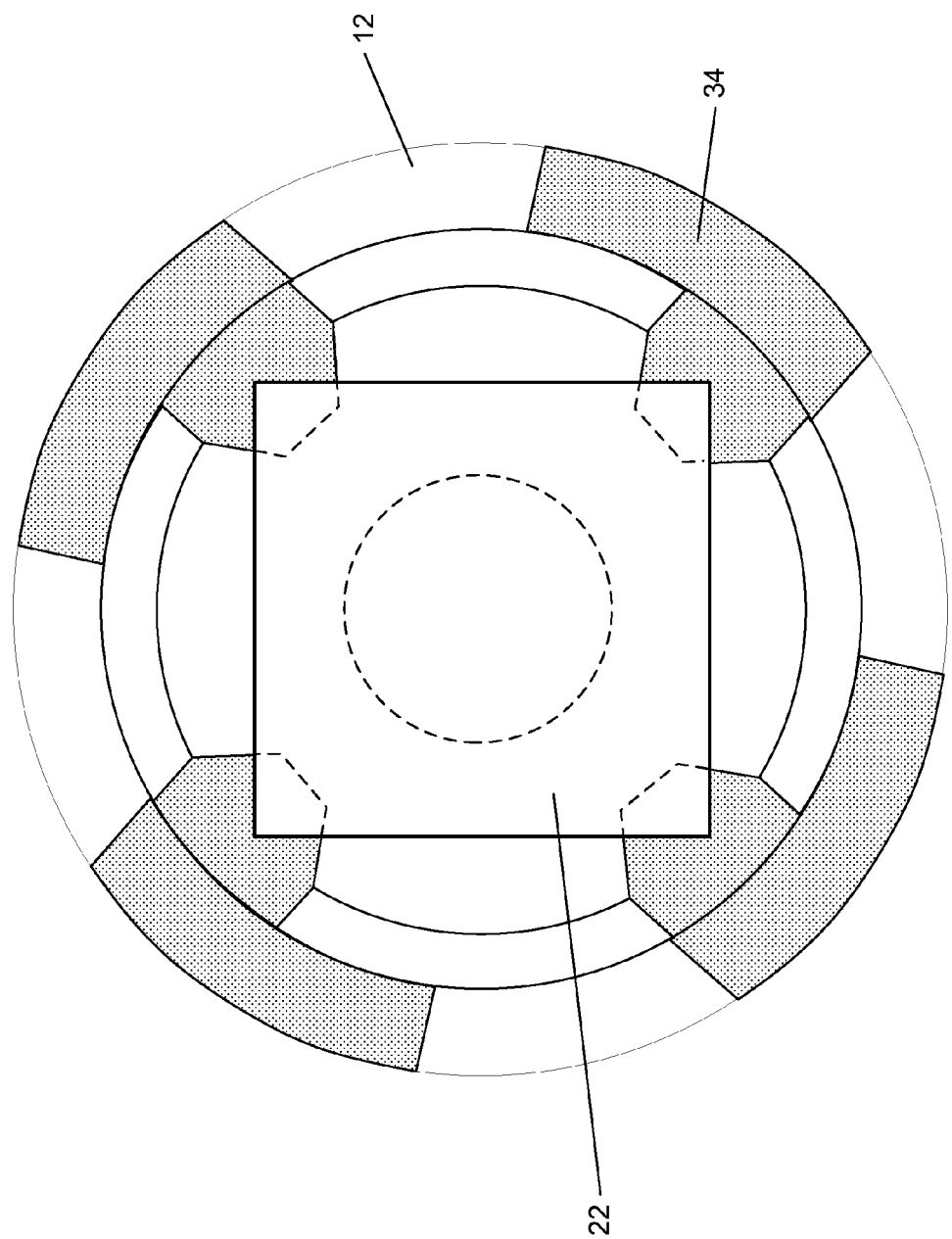
FIG. 6B is a top view of an interior of the lens structure of FIG. 6 showing an active optical element in place adjacent to the electrical contact points of the lens structure.

FIG. 6 shows another variation of the present invention in which a molded interconnect device (MID) approach is used to create a connection between the active optical element and the camera housing or surrounding devices. This embodiment is similar to that shown in FIG. 2, but in place of stamped metal contact pieces, MID elements 32 are used. As with the contacts of the FIG. 2 embodiment, The MID elements pass in between the inner portion 14 and the outer portion 12 of the barrel and make electrical connection to the embedded active optical element by way of conductive adhesives. In this embodiment, the MID elements may form contact surfaces 34 on an interior of the outer portion 12 of the barrel, as is shown in FIG. 6A. These contact surfaces 34 allow for an easy means of making an electrical connection to the active optical element such as a TLCL 22. FIG. 6B, for example, is a view of the outer portion 12 with a TLCL 22 having the corners of its square shape positioned adjacent to the contact surfaces 34. Surface electrical contacts located in the corners of the TLCL 22 thereby make electrical contact with the contact surfaces 34 of the outer portion. When the outer portion 12 is assembled with the inner portion 14 of the barrel, the corners of the TLCL 22 rest between surfaces of the two portions, and may be thereby held in place in the barrel.

Figure 7:
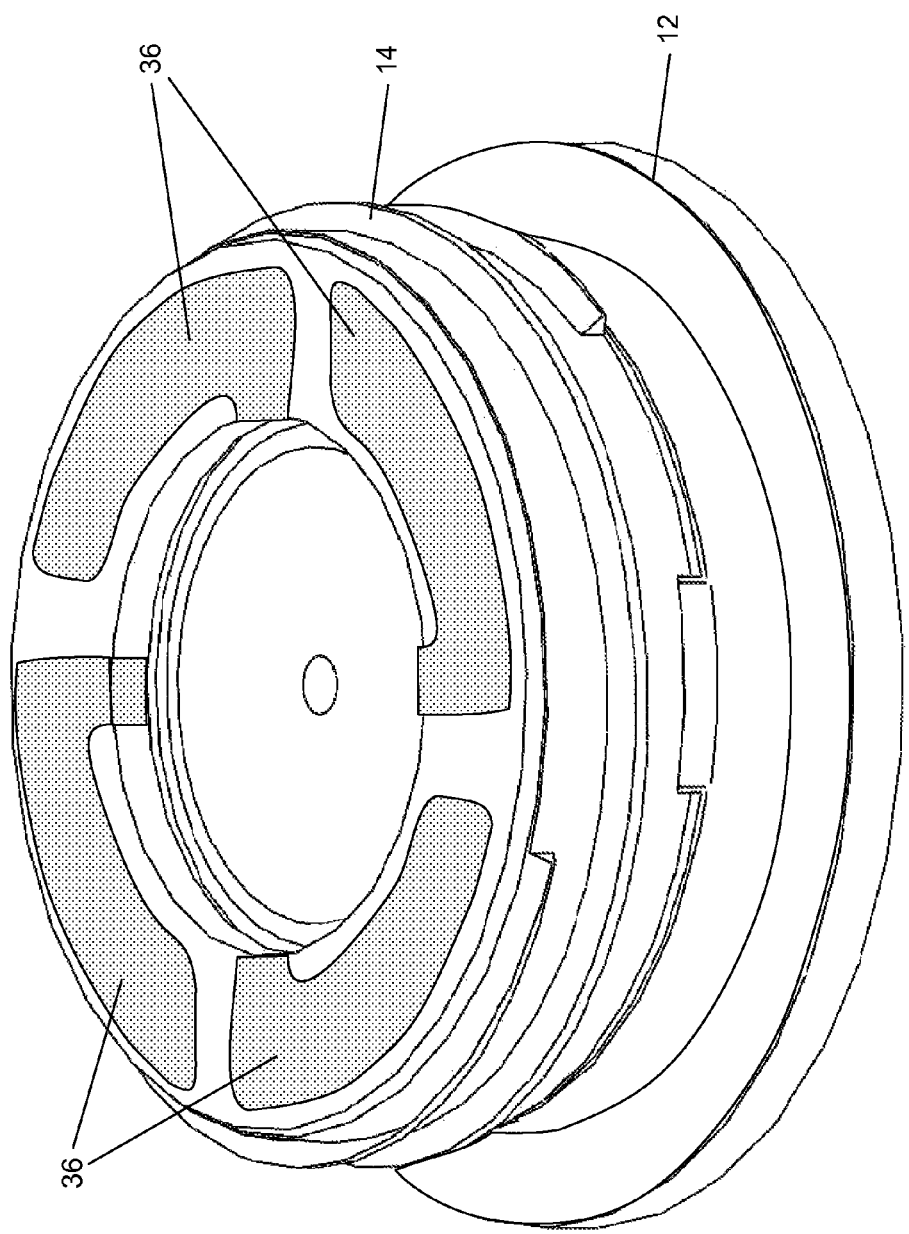
FIG. 7 is a perspective view of a lens structure according to the present invention in which a molded interconnect device is used to provide electrical connection between an active optical element and an inner surface of an inner portion of the lens structure.
Figure 7A:
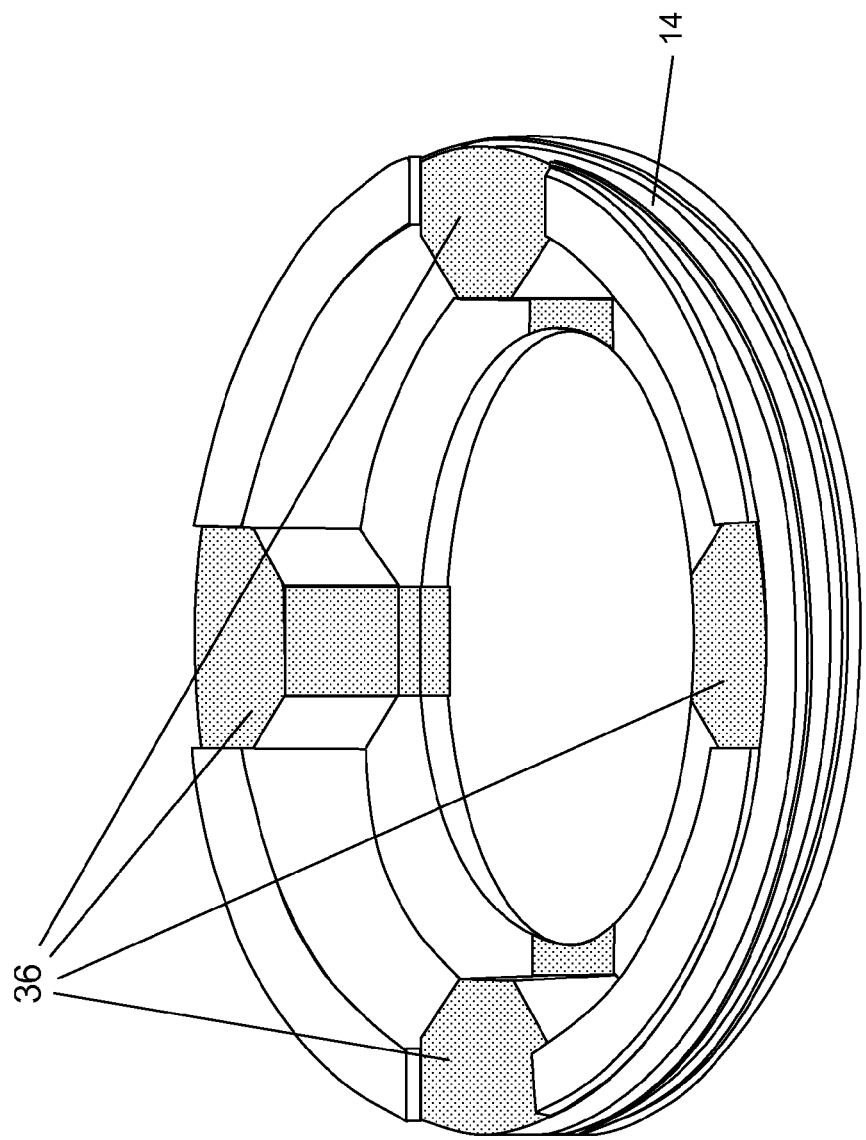
FIG. 7A is a perspective view of an interior of an inner portion of the lens structure of FIG. 7 showing the location of electrical contact points.

As with the stamped metal contact embodiment, the MID contacts may also extend to an inner surface of the inner portion 14. In the embodiment shown in FIG. 7, the MID contacts 36 are positioned to make contact with corresponding contacts on a surface of the device to which the lens structure is attached. The MID contacts 36 in this embodiment extend along an interior surface of the inner portion 14 to locations adjacent to the active optical element. This is shown more clearly in FIG. 7A, which is an isolated view of the inner portion 12 of FIG. 7 as seen from the opposite side. While the active optical element (such as a TLCL 22) is not shown in this figure, those skilled in the art will understand that such an element with a square shape could rest within the barrel with corresponding electrical contacts located in the corners of the square shape located adjacent to the interior surfaces of the MID contacts 36.

Figure 8:
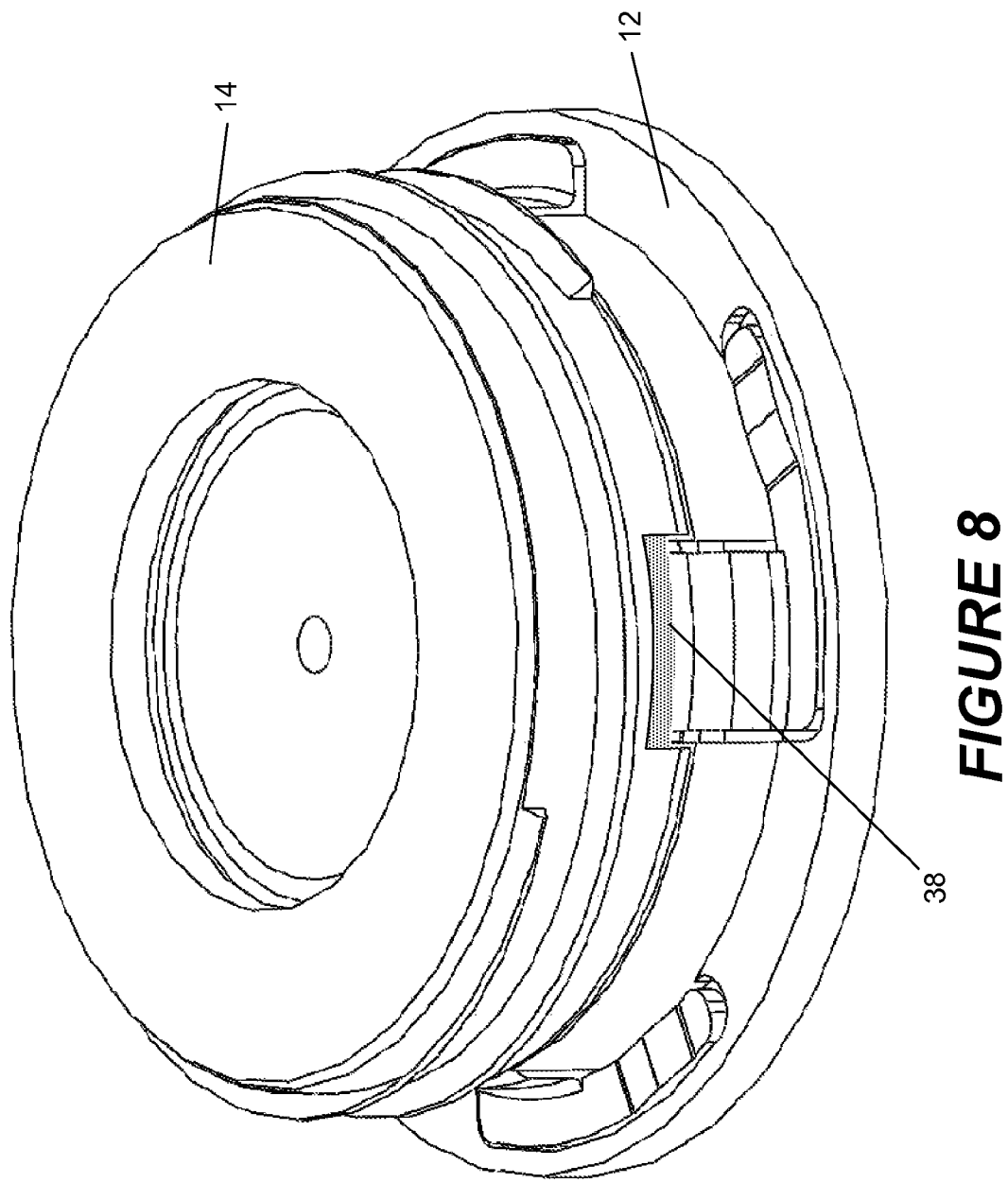
FIG. 8 is a perspective view of a lens structure according to the present invention showing gaps via which an electrically conductive adhesive may be applied to the connection points between an active optical element and the electrical contacts of the lens structure.

In each of the embodiments having an active optical element within the barrel making contact with electrical contacts located substantially between an inner portion and an outer portion of a barrel structure, the two portions may be constructed such that, when assembled together, small gaps remain between them in the vicinity of the electrical contacts. Such gaps 38 are shown in the perspective view of FIG. 8, although it will be understood by those skilled in the art that such gaps may be used with any of the embodiments described herein. Since the electrical contacts of the active optical element will reside adjacent to the electrical contacts of the barrel assembly, gaps 38 may serve as access points by which to apply a conductive adhesive that both secures the electrical components together and provides a more robust electrical connection between them.

Figure 9:
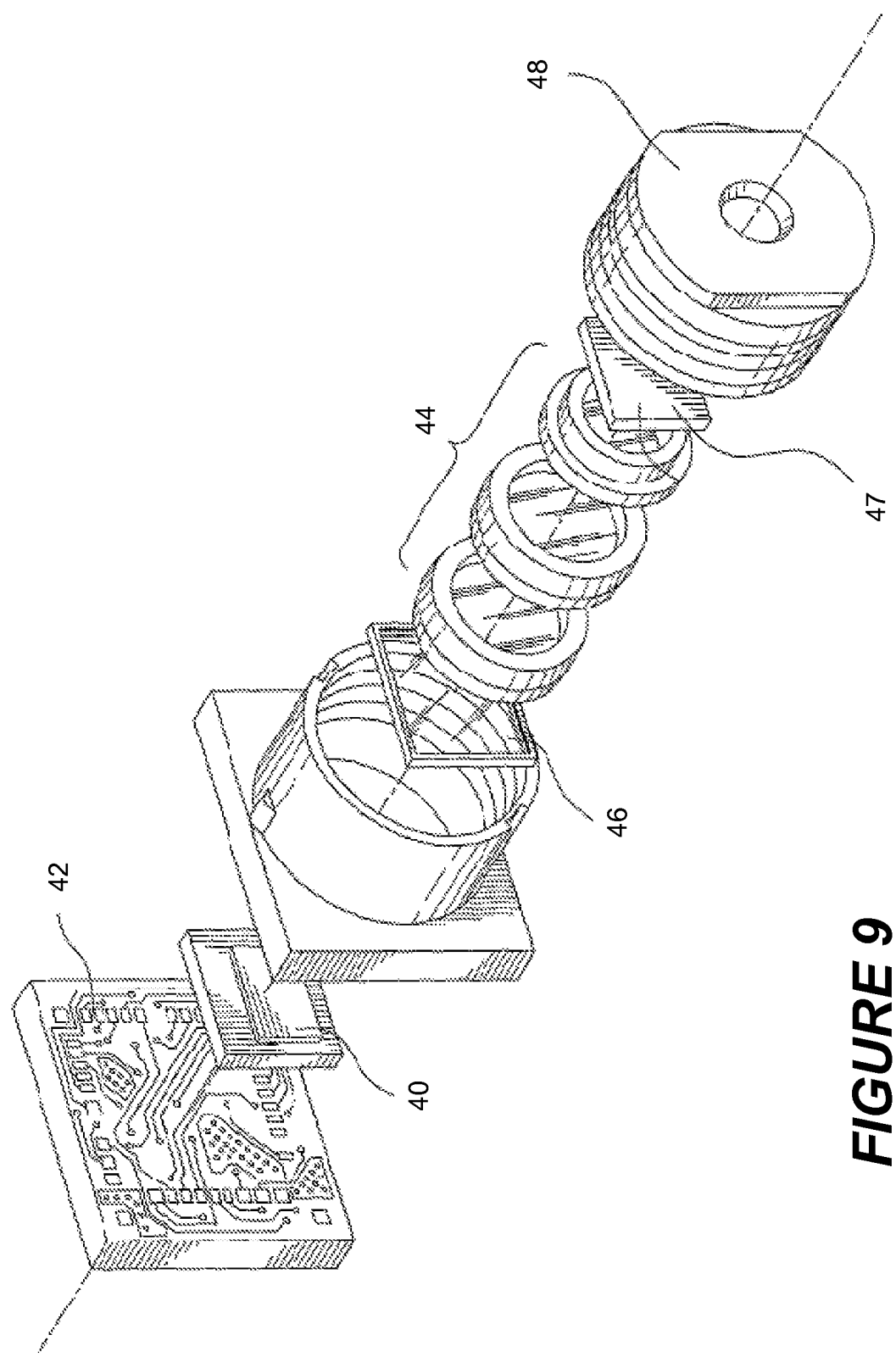
FIG. 9 is a perspective view of a single barrel configuration in which the present invention may be used, the figure depicting a socket flange base in an exploded view showing the image sensor, circuit board and the various optical elements.

It will be appreciated that the barrel can be provided with a base, for example incorporating a flange, and that electrical connections between the active embedded optical element and the circuit board may be through the barrel base. The barrel body incorporates the required conductors to conduct signals from the circuit board to the contacts on the barrel body in contact with the active element. FIG. 9 illustrates a conventional single barrel having a socket flange base in an exploded view showing the image sensor 40, circuit board 42 and the various optical elements, including fixed lenses 44, IR glass 46 and TLCL 47, which is protected by barrel cover 48. The base contacts and integration of the conductors and embedded active optical element contacts are not detailed in FIG. 9. An arrangement such as shown in this figure may be used with the present invention. In such a case, the barrel body shown in FIG. 9 would be one of those presented in the foregoing embodiments, with the active optical element positioned therewithin between the two barrel portions.

The present invention also includes the possibility of using active optical devices other than lenses in a configuration such as that presented herein. For example, in an arrangement similar to that shown in FIG. 1, in place of TLCL 22, an electrically activated shutter may be provided.

Figure 10A:
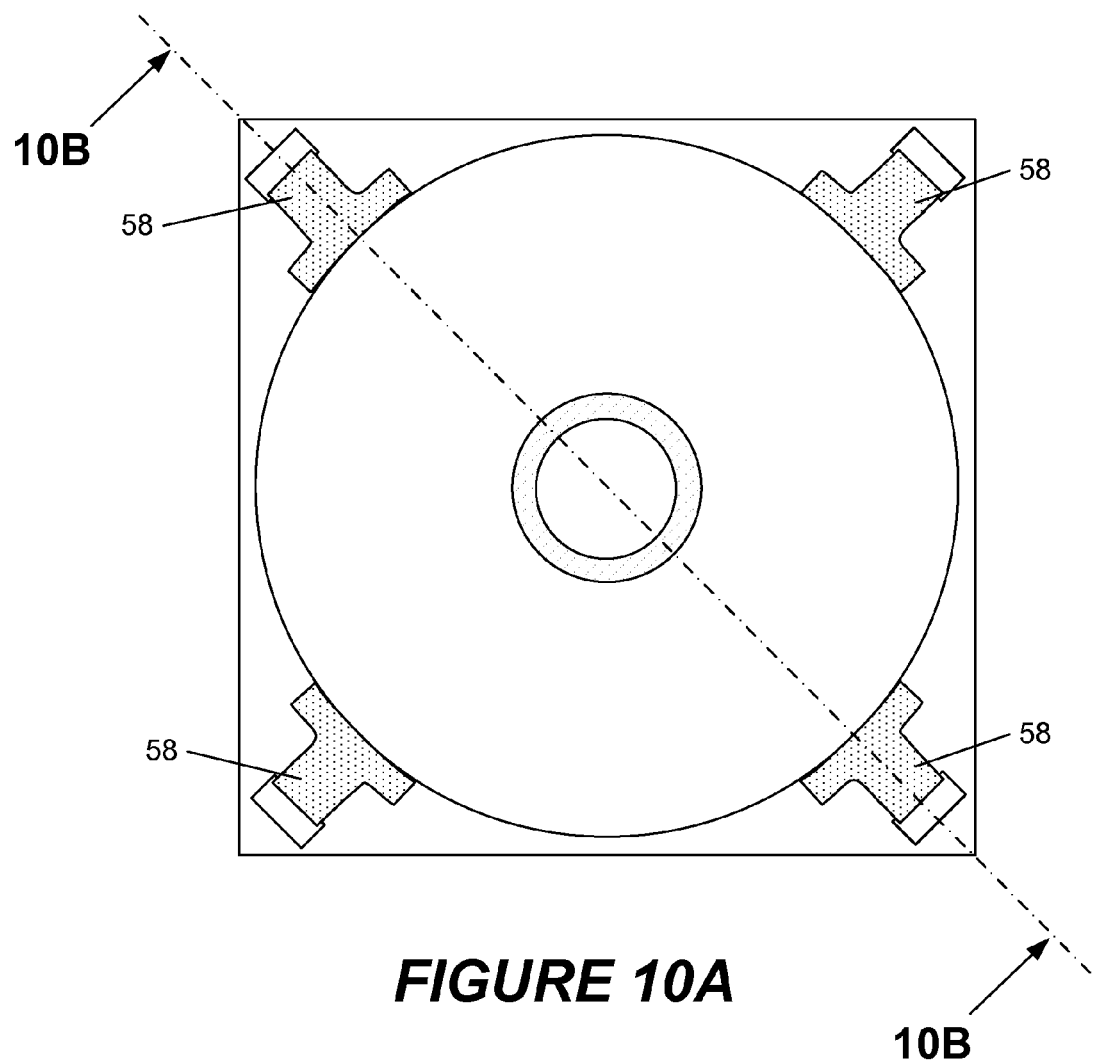
FIG. 10A is a top view of an assembly including a unitary image sensor and barrel lens mounting that has a tunable liquid crystal device to provide a tunable focus camera.
Figure 10B:
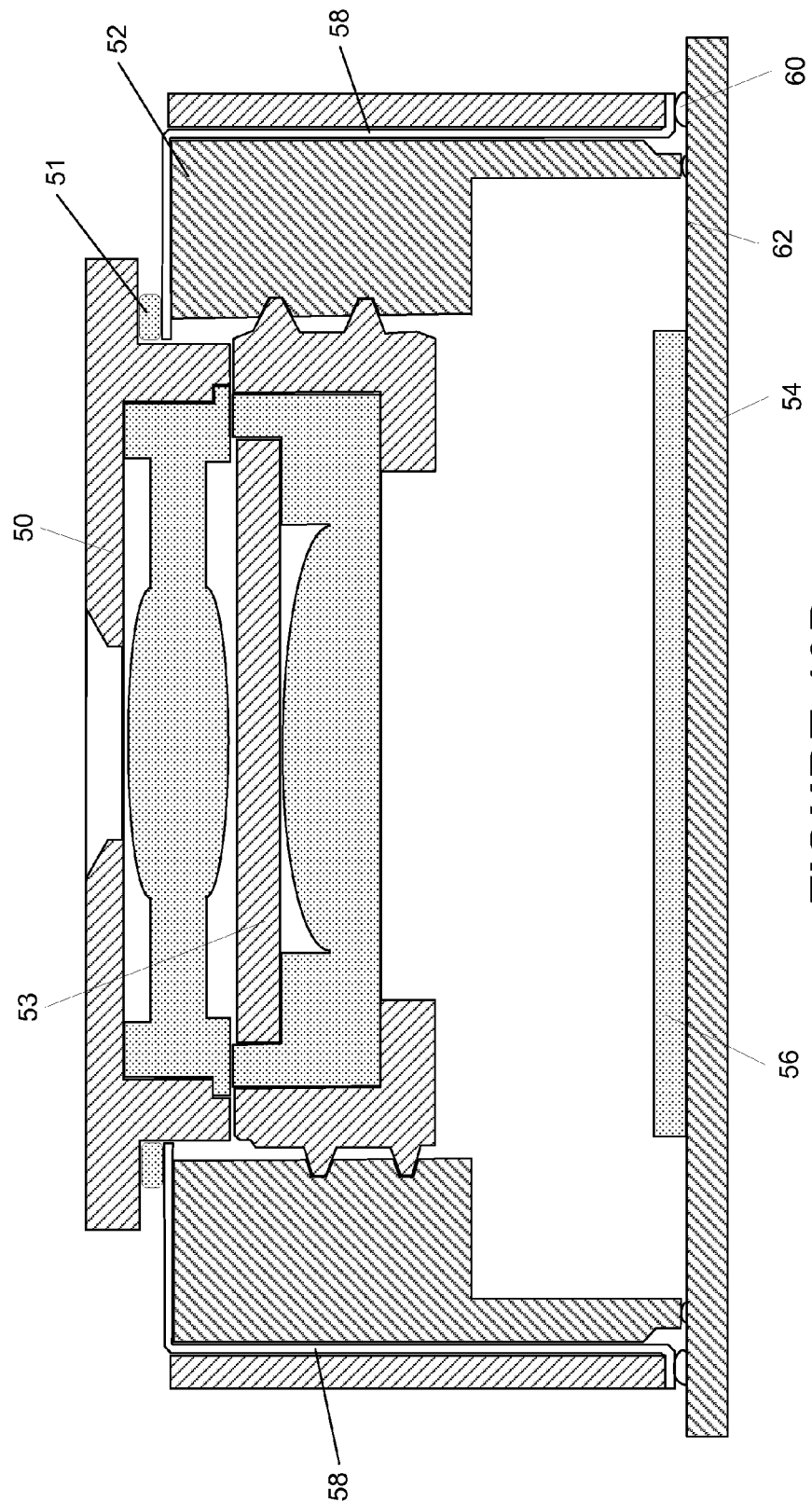
FIG. 10B is a cross sectional side view of the assembly of FIG. 10A.

In the embodiment of FIGS. 10A and 10B, there is shown a design for incorporation of a barrel with an active optical element (in this case a TLCL) into a camera module unit. FIG. 10A is a top view of the device, and indicates the section line corresponding to the cross-sectional view of FIG. 10B. As shown, the barrel (i.e., lens/TLCL assembly) 50 fits within housing assembly 52, which is mounted to PC board substrate 54, which also supports image sensor 56. It is beneficial in this, and other, embodiments that the two fixed lens components make contact with each other to ensure a proper alignment and orientation between them. In this embodiment, the housing is threaded to receive the threaded barrel assembly, and includes four metallic inserts 58, such as lead frames, for completing connection from the barrel assembly 50 to the camera substrate. Since the barrel assembly 50 includes conductive contacts 51 that are electrically connected to the active optical element 53, the metallic inserts 58 provide the necessary electrical pathways to the substrate. Thus, this configuration allows electrical connection between the active optical element 53 and the substrate 54, despite the fact that the barrel assembly may have imprecise height and rotational angle relative to the housing.

As indicated in the inset portion of the drawing, the metallic inserts 58 are electrically connected to the board 54 using conductive glue 60, although solder could also be used. The housing 52 itself is also connected to the substrate 54 using glue (typically non-conductive), but bumps 62 are provided on the bottom of the housing surface which extend beyond the glue to make contact with the substrate 54. In this way, a precise distance is maintained between the housing 52 and the substrate 54 which is not affected by the thickness or flatness of the glue layer.

Figure 11A:
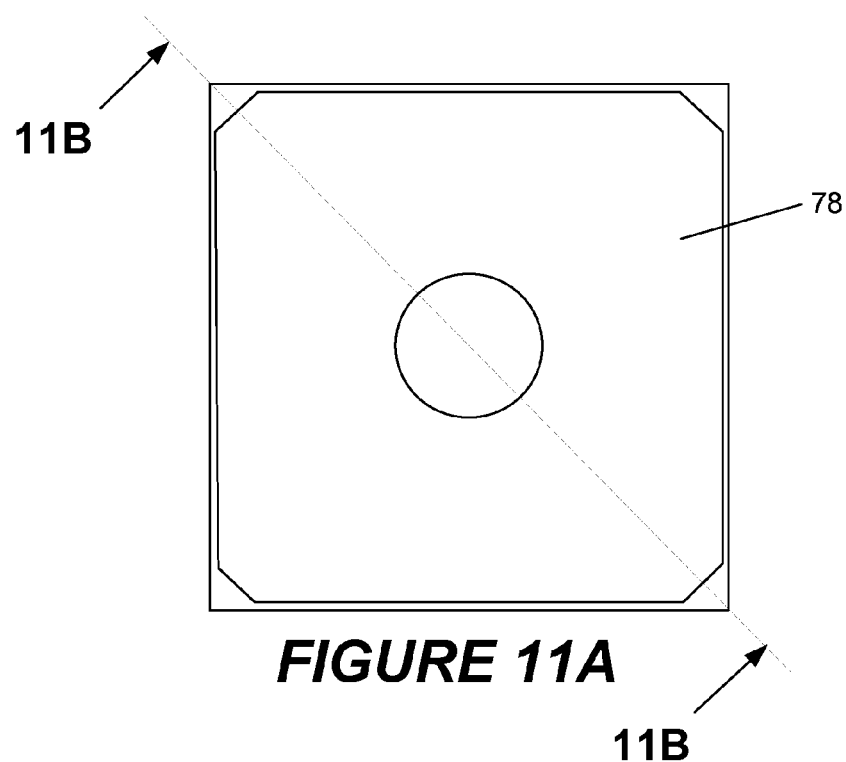
FIG. 11A is a top view of an assembly including a unitary image sensor, a barrel lens mounting and a tunable liquid crystal device, and that functions as a fixed focus camera.
Figure 11B:
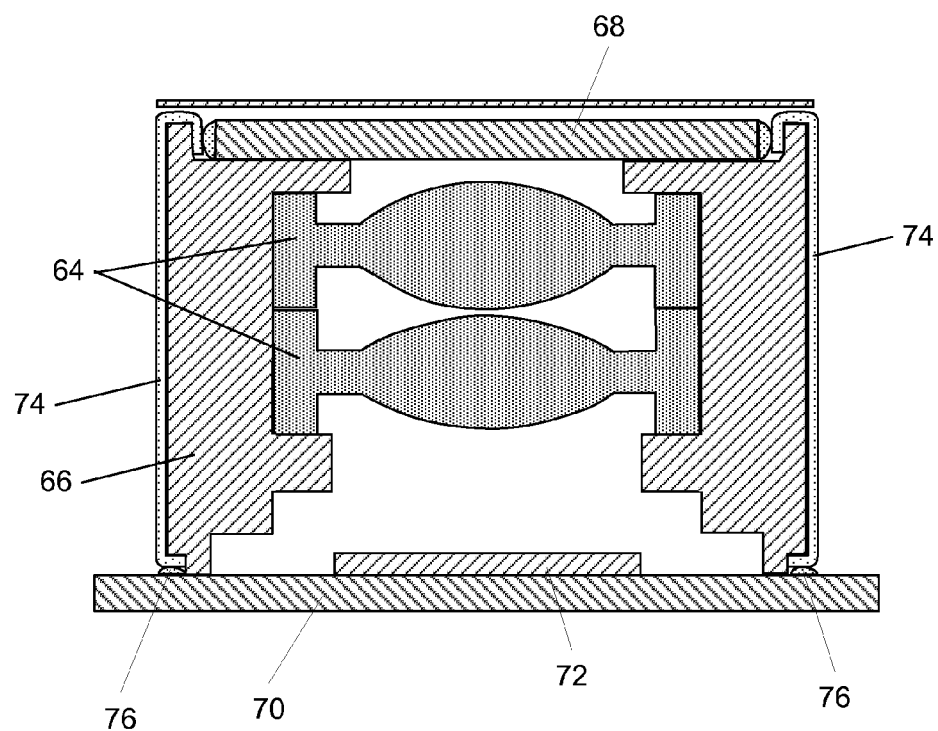
FIG. 11B is a cross sectional side view of the assembly of FIG. 11A.

In the embodiment of FIGS. 11A and 11B, there is shown a fixed focus camera module. FIG. 11A is a top view of the device, and shows a section line along which the cross section of FIG. 11B is taken. Two lens elements 64 are permanently mounted within a housing 66 with no adjustability for focus.

A TLCL 68 is located at the side of the housing opposite PC board substrate 70, to which is mounted image sensor 72. As in the embodiment of FIGS. 10A and 10B, electrical connection is made between the substrate and the TLCL via metallic inserts 74 that run vertically in the corners of the housing, being connected to the substrate via conductive glue 76. In the same manner as the embodiment of FIGS. 10A and 10B, the housing 66 also makes use of bumps at its base to provide a precise setoff between the housing and the substrate 70. A top cover 78 of the housing blocks light except that in the main optical path, and provides mechanical protection to TLCL 68, which is mounted at the top of the device, above the fixed lenses.

Normally, most miniature cameras consist of a separate housing and a lens barrel, among other parts. One important operation during construction is to thread the lens barrel into the housing, activate the sensor, and adjust the focus by turning the barrel to achieve the best focus for camera system. This operation requires special equipment and is costly due to extra operation and reducing yield by creating particles due to rubbing of barrel surface against the housing thread surface.

A focus-free camera module refers to a camera module that is constructed by utilizing a camera housing with lenses integrated into the housing permanently before attachment to the sensor substrate. Thus, for a configuration such as that shown in FIGS. 11A and 11B, there will be no adjustment of focus during the assembly process. The main issue with such a construction is that the tolerances of the assembly (physical and optical) may not be tight enough to ensure a precise focus at the sensor surface, and an out-of-focus image may result. However, in the present embodiment, minute focus errors may be compensated for by adjusting the optical power of the TLCL 68.

Figure 12A:
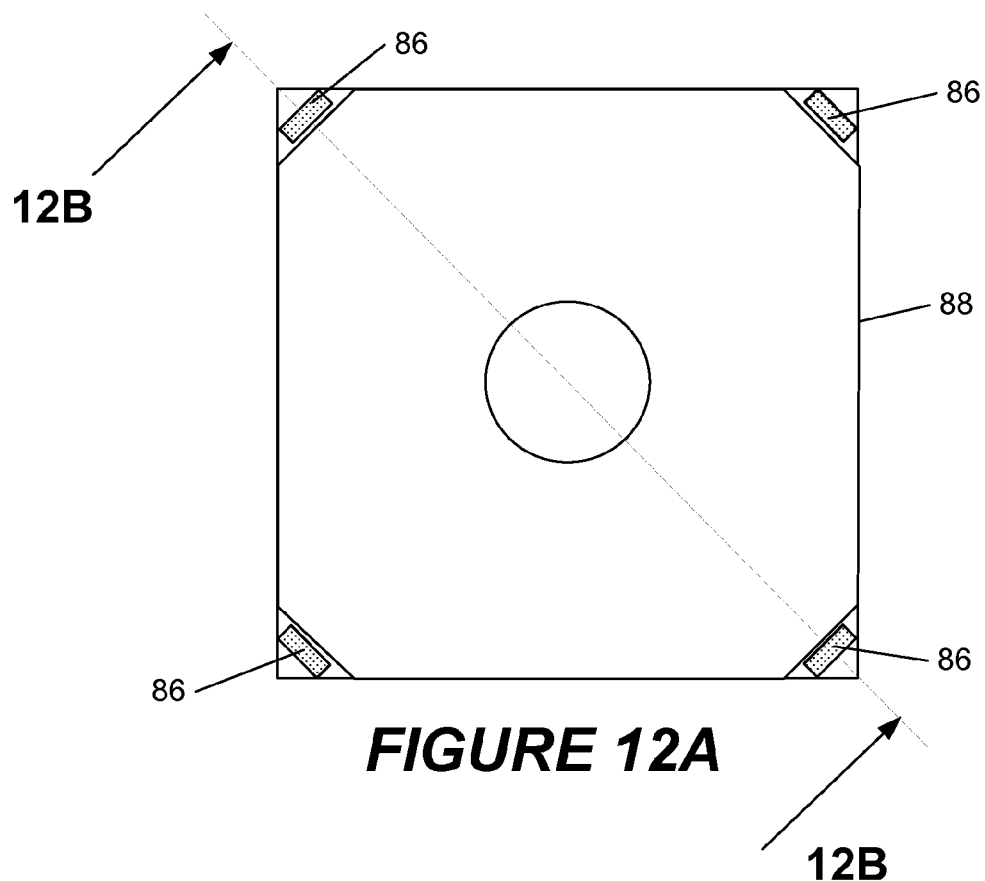
FIG. 12A is a top view of an assembly similar to that of FIGS. 11A and 11B, but that has the tunable liquid crystal device located between two lens elements of the structure.
Figure 12B:
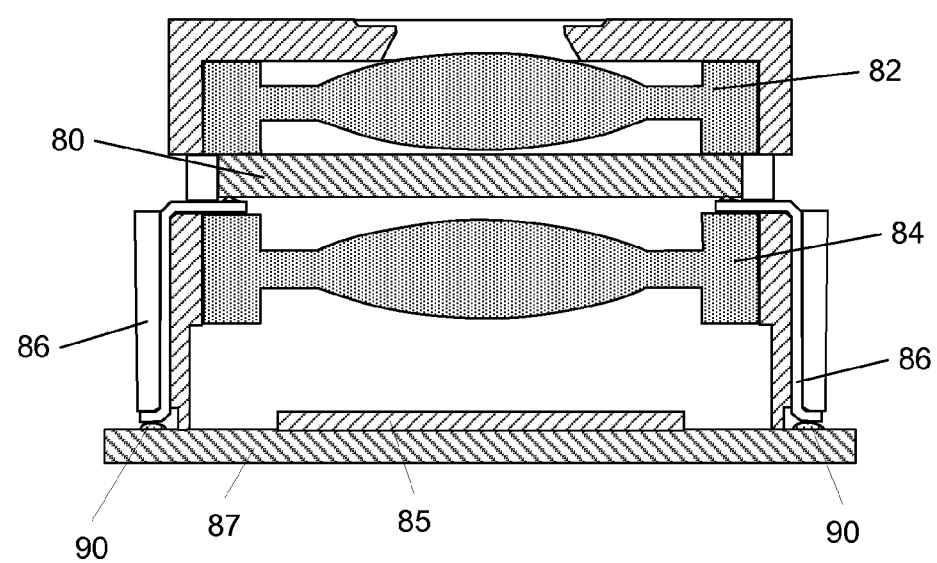
FIG. 12B is a cross sectional side view of FIG. 12A.

In the embodiment of FIGS. 12A-12B, a focus-free camera module uses an active optical element (TLCL 80) is located between primary lens 82 and secondary lens 84 of the lens stack. This configuration is similar to that of FIG. 11, except for the location of the TLCL. A focus plane of the lens structure can be actively adjusted by changing the optical power of the TLCL 80 to compensate for an improper distance of the lens stack from the sensor 85. As with the embodiment of FIGS. 11A and 11B, this design enables construction of cheaper cameras, utilizing parts with usual tolerances and without any focusing operation.

The top view of FIG. 12A shows the location of metallic inserts 86 along the side edges of the lens housing 88. Unlike the FIG. 11A, 11B embodiment, the metallic inserts do not run all the way to the top of the housing but, rather, only to the vertical position of the TLCL 80. This is shown in the cross section of FIG. 12B, which is taken along the section line shown in FIG. 12A and which shows the relative positions of the fixed lenses and the TLCL within the housing. The inserts 86 are connected to the substrate 87 using conductive glue 90, and the housing has a setoff bump, as in the previous embodiments. This configuration, along with the capability of the embedded TLCL to adjust the focus plane, can enable proper camera focus without adjustment of the barrel.

Figure 13B:
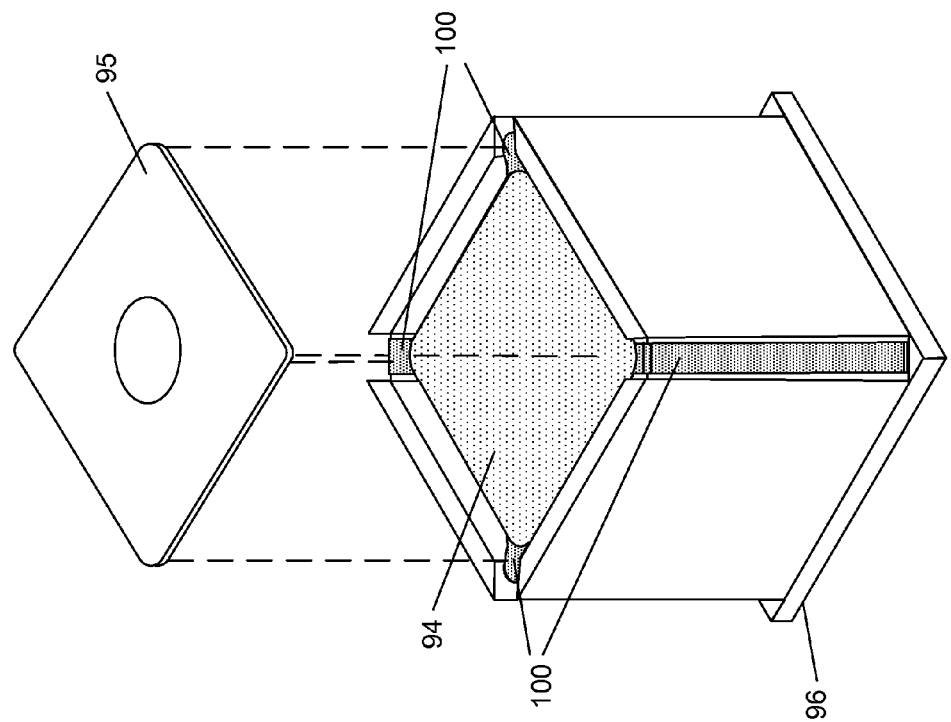
FIG. 13B is a perspective view of the assembly of FIG. 13A with a top cover of the assembly removed.
Figure 13A:
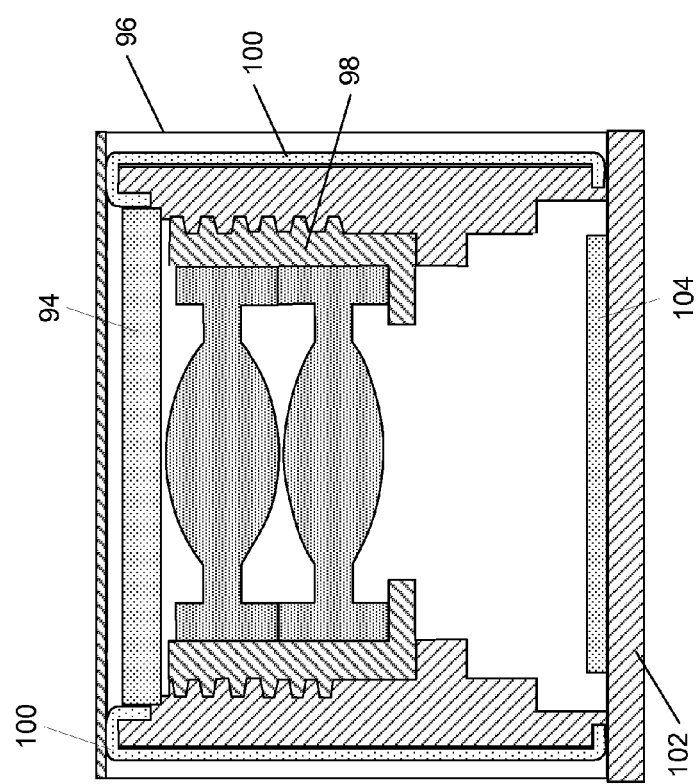
FIG. 13A is a cross sectional view of a unitary image sensor and barrel lens mounting that has a top cavity for receiving the tunable liquid crystal lens device after assembly of the image sensor and barrel lens.

In the embodiment of FIGS. 13A-13B, the camera need not be a fixed-focus camera. This design shows an easy and low cost way of incorporating a TLCL 94 into a conventional camera module. In this configuration, a camera housing 96 is designed and molded in such a way that there is a cavity on the top of the housing to receive the TLCL, while allowing for a barrel-type lens to be inserted into a socket in the housing before inserting the TLCL. Once assembled, the TLCL 94 resides directly adjacent to the lens barrel 98, in close proximity to the lens elements. Connection is provided by metallic inserts 100, as apparent from FIG. 13B, which shows the housing with top cover 95 removed. These connectors can also be seen in the cross sectional view of FIG. 13A which, like earlier embodiments, is taken along a diagonal section line. This embodiment may also use a conductive glue to connect the metallic inserts to the substrate 102 and the setoff bumps that function as in the previous embodiments.

This camera module can include a conventional lens barrel 98 that is threaded into the housing. One possible assembly sequence for the assembly of this embodiment is to attach the housing, including the lens barrel, to the substrate 102 that supports the CMOS sensor. At this time, the electrical contacts 100 in the housing can be connected to the substrate by the conductive adhesive over the connection pads on the camera substrate. After attachment, the lens barrel 98 is turned and focused, as is done in conventional camera modules, and glue added to the threads to fix the barrel in the desired position. After this camera is tested, the bare TLCL 94 (TLCL part with no housing or FPC) is placed into the top cavity and aligned with respect to the lens barrel aperture. At this time, conductive adhesive is applied to connect the contacts on the TLCL to the electrical contacts in the housing, after which the top cover 95 is placed over the TLCL 94 to close the housing. In an arrangement such as this, therefore, focus tuning of the device can be done manually and by adjustment of the TLCL.

It will be appreciated that in various embodiments, the active optical element can be placed on the top, in the middle, or on the bottom of other lens elements depending on the optical design of the fixed element lenses. In each of these cases electrical connections can be made similarly. It will also be appreciated that, in terms of construction, the lens barrel can be constructed in two pieces or as a single piece.

What is claimed is:

1. An electrically controllable optical lens apparatus comprising:
    a first optical lens through which an optical signal passes;
    a second optical lens that is fixed in position relative to the first optical lens; and
    an electrically controllable active optical element that is located at a fixed position between the first and second lenses and through which the optical signal passes, the active optical element changing its optical characteristics from a first state to a second state in response to an input electrical signal, such that the active optical element exerts a different optical influence on the optical signal in the first state than in the second state.

2. An optical lens apparatus according to claim 1 wherein the active optical element comprises an electrically tunable lens.

3. An optical lens apparatus according to claim 2 wherein the active optical element comprises a tunable liquid crystal lens.

4. An optical lens apparatus according to claim 1 wherein the first lens is mounted in a first portion of a lens enclosure and the second lens is mounted in a second portion of the lens enclosure, and wherein the first and second portions of the lens enclosure may be rigidly secured to each other.

5. An optical lens apparatus according to claim 4 wherein the lens enclosure is a barrel structure.

6. An optical lens apparatus according to claim 4 wherein the active optical element is located between the first and second portions of the lens enclosure.

7. An optical lens apparatus according to claim 4 further comprising at least one electrical conductor that provides an electrically conductive path between an outer surface of the lens enclosure and the active optical element.

8. An optical lens apparatus according to claim 7 wherein the electrical conductor comprises a spring biased contact.

9. An optical lens apparatus according to claim 7 wherein the electrical conductor comprises a molded interconnect device.

10. An optical lens apparatus according to claim 7 further comprising an electrically conductive adhesive between the electrical conductor and the active optical element.

11. An optical lens apparatus according to claim 7 wherein the active optical element has a substantially planar shape and a conductive portion of the active optical element adjacent to an edge of the planar shape is in electrical communication with the electrical conductor.

12. An optical lens apparatus according to claim 4 wherein the lens enclosure comprises a detent by which the lens enclosure may be connected to a receiving device making use of the lens apparatus.

13. An optical lens apparatus according to claim 12 wherein the detent comprises a screw thread.

14. An optical lens apparatus according to claim 12 wherein the detent comprises an alignment element that facilitates the location of the lens enclosure in a desired position relative to the receiving device.

15. An electrically controllable optical lens apparatus comprising:
a first optical lens for passing an optical signal;
a second optical lens for passing the optical signal, the second optical lens being fixed in position relative to the first optical lens;
an electrically controllable active optical element that is located at a fixed position relative to the first and second lenses and is configured to pass the optical signal, the active optical element being configured to change its optical characteristics from a first state to a second state in response to an input electrical signal, such that the active optical element exerts a different optical influence on the optical signal in the first state than in the second state;
a lens enclosure that encompasses the first and second optical lenses and the active optical element, said enclosure being rigidly mounted to an image sensor housing that contains an image sensor for receiving the optical signal and that has at least one electrical contact on an outer surface; and
at least one electrical conductor integral with the lens enclosure that provides an electrical path between the active optical element within the enclosure and an external surface of the enclosure such that, when the enclosure is mounted to the image sensor housing, electrical communication is established between the electrical conductor and a corresponding electrical contact of the image sensor housing,
wherein the second optical lens is located between the image sensor and the active optical element.

16. An optical lens apparatus according to claim 15 wherein the first lens is mounted in a first portion of the lens enclosure and the second lens is mounted in a second portion of the lens enclosure, and wherein the first and second portions of the lens enclosure may be rigidly secured to each other.

17. An optical lens apparatus according to claim 15 wherein the lens enclosure comprises a barrel structure.

18. An optical lens apparatus according to claim 15 wherein the active optical element is located between the first and second lenses.

19. An optical lens apparatus according to claim 15 wherein the electrical conductor comprises a spring biased contact.

20. An optical lens apparatus according to claim 15 wherein the electrical conductor comprises a molded interconnect device.

21. An optical lens apparatus according to claim 15 further comprising an electrically conductive adhesive between the electrical conductor and the active optical element.

22. An optical lens apparatus according to claim 15 wherein the active optical element has a substantially planar shape and a conductive portion of the active optical element adjacent to an edge of the planar shape is in electrical communication with the electrical conductor.

23. An optical lens apparatus according to claim 15 wherein the lens enclosure comprises a detent by which the lens enclosure may be connected to a receiving device making use of the lens apparatus.

24. An optical lens apparatus according to claim 23 wherein the detent comprises a screw thread.

25. An optical lens apparatus according to claim 23 wherein the detent comprises an alignment element that facilitates the location of the lens enclosure in a desired position relative to the receiving device.

26. A camera module comprising:
a barrel lens assembly comprising a first lens and a second lens;
a tunable liquid crystal lens;
an image sensor; and
a mounting having a base configured to connect to an image sensor, a socket for adjustably receiving said barrel lens assembly, an adjustment of said barrel lens assembly with respect to said image sensor allowing for an initial focus adjustment, and a mount for receiving said tunable liquid crystal lens, at least one of said first and second lenses being located between said image sensor and said tunable liquid crystal lens.

27. A camera module comprising:
the electrically controllable optical lens apparatus according to claim 1;
an image sensor; and
a mounting having a base configured to connect to the image sensor, a socket for adjustably receiving a barrel lens assembly, an adjustment of said barrel lens assembly with respect to said image sensor allowing for an initial focus adjustment, and a top or a bottom mounting for receiving a tunable liquid crystal lens of said electrically controllable optical lens apparatus.

28. A camera module comprising:
the electrically controllable optical lens apparatus according to claim 15;
an image sensor; and
a mounting having a base configured to connect to the image sensor, a socket for adjustably receiving a barrel lens assembly, an adjustment of said barrel lens assembly with respect to said image sensor allowing for an initial focus adjustment, and a top or a bottom mounting for receiving a tunable liquid crystal lens of said electrically controllable optical lens apparatus.

29. An electrically controllable optical lens apparatus comprising:
a lens enclosure having a mounting end configured to be mounted to a support;
a first optical lens for passing an optical signal, the first optical lens being supported by the lens enclosure;

a second optical lens supported by the lens enclosure for passing the optical signal, the second optical lens being fixed in position relative to the first optical lens; and an electrically controllable active optical element supported by the lens enclosure, located at a fixed position relative to the first and second lenses and configured to pass the optical signal, the active optical element being configured to change its optical characteristics from a first state to a second state in response to an input electrical signal, such that the active optical element exerts a different optical influence on the optical signal in the first state than in the second state;

wherein the first optical lens or the second optical lens or both the first optical lens and the second optical lens are located between the active optical element and the mounting end.

30. An optical lens apparatus according to claim 29 wherein the mounting end includes a connector configured to connect the lens enclosure to the support.

\* \* \* \* \*